July 26, 1955  E. J. ROTH  2,713,958
APPARATUS FOR HANDLING RAISED DOUGH FORMS
Filed Aug. 2, 1951  4 Sheets-Sheet 1
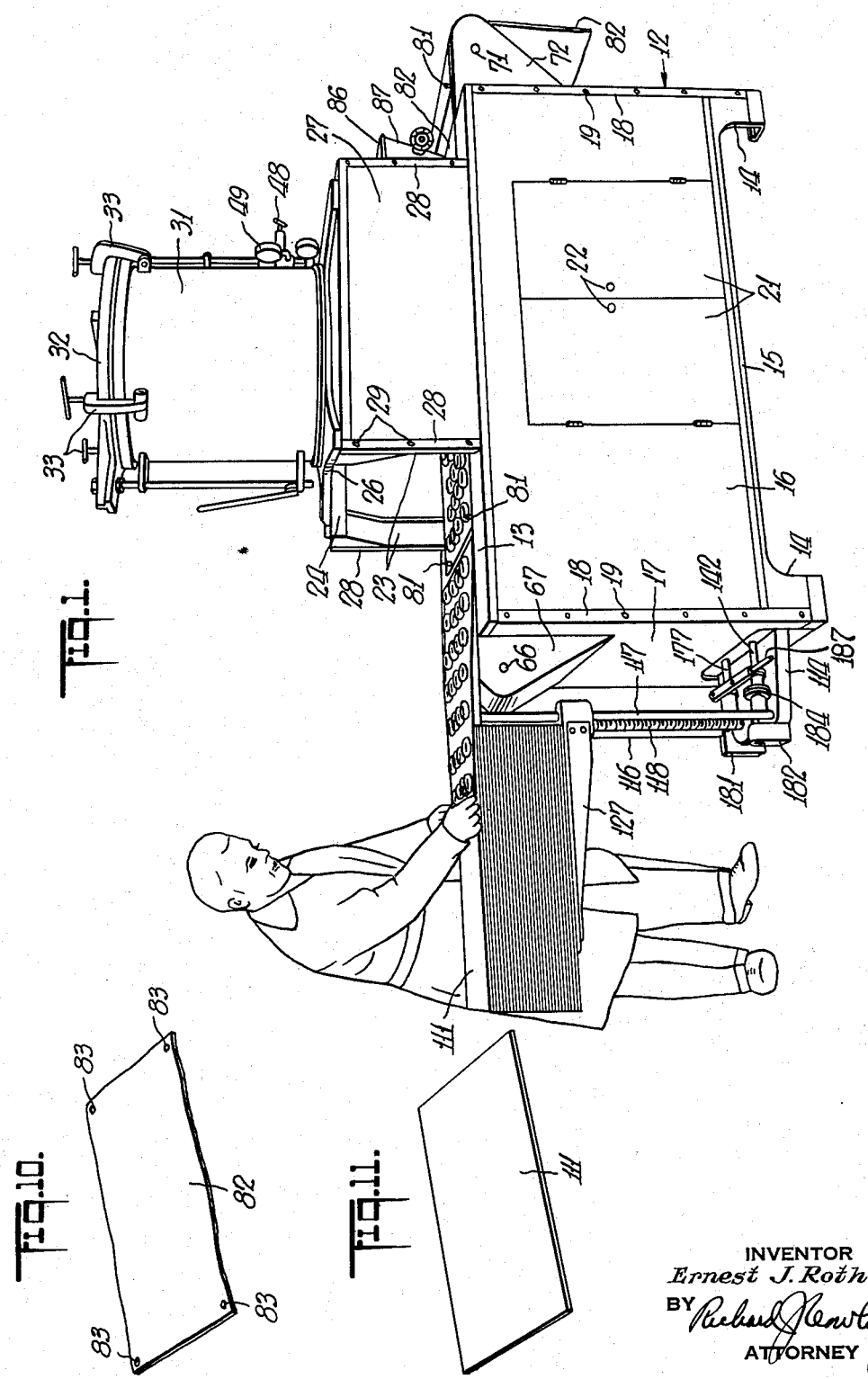
INVENTOR
*Ernest J. Roth*
BY
ATTORNEY

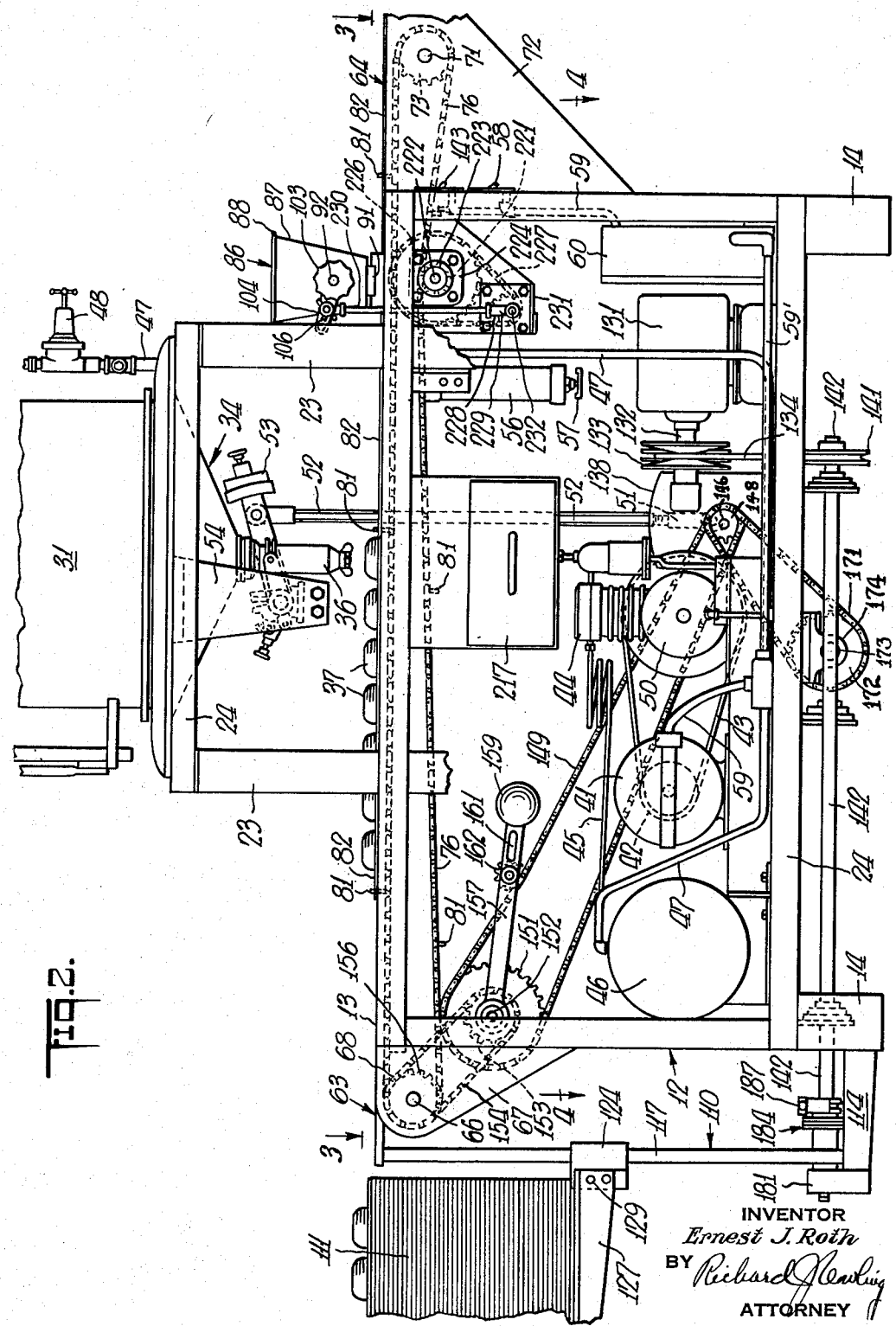

July 26, 1955 E. J. ROTH 2,713,958
APPARATUS FOR HANDLING RAISED DOUGH FORMS
Filed Aug. 2, 1951 4 Sheets-Sheet 3
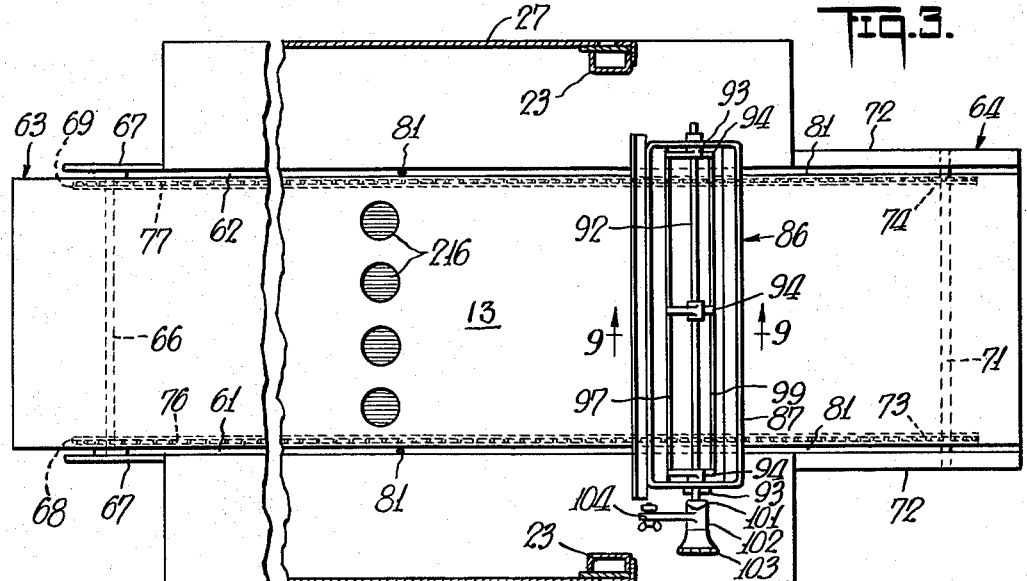
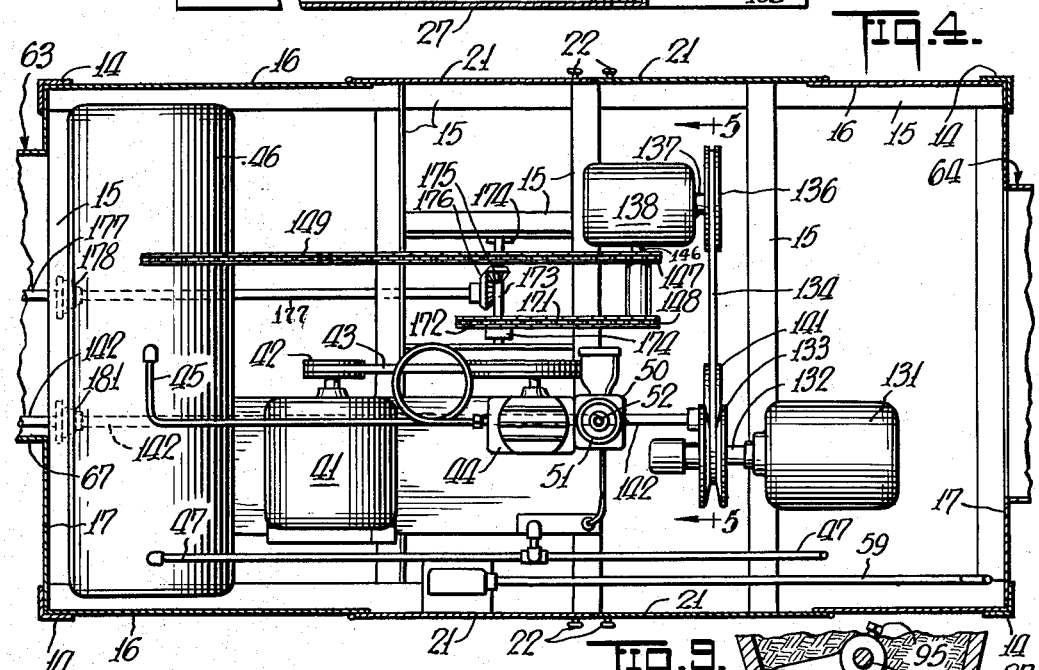
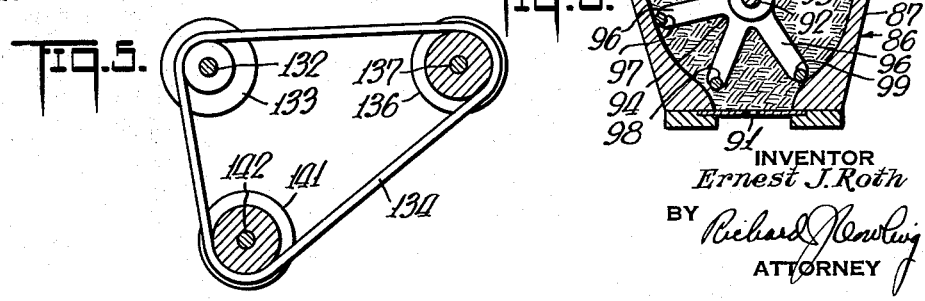
INVENTOR
*Ernest J. Roth*
BY
ATTORNEY

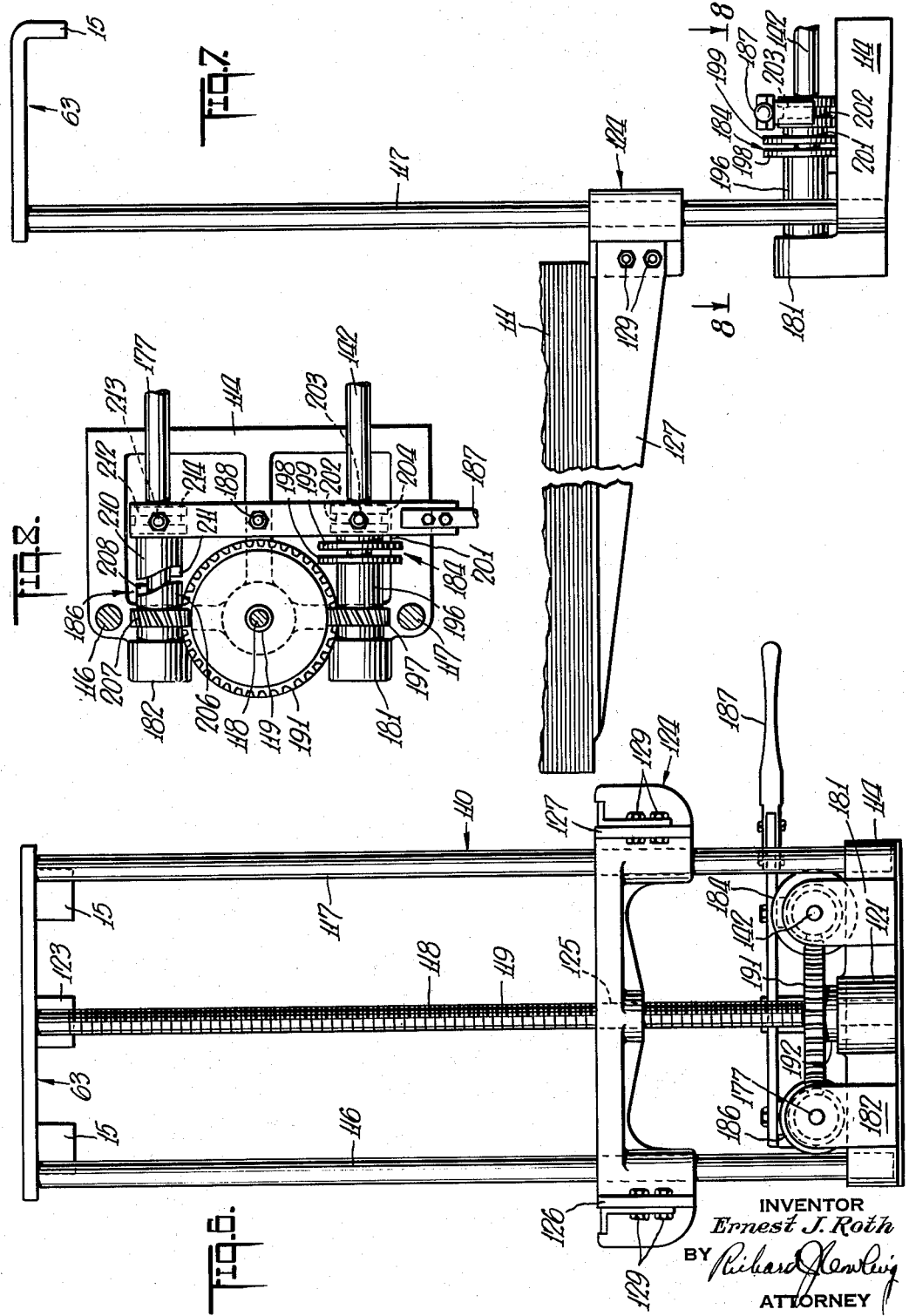

United States Patent Office 2,713,958
Patented July 26, 1955

2,713,958

APPARATUS FOR HANDLING RAISED DOUGH FORMS

Ernest J. Roth, Rockleigh, N. J., assignor to Joe Lowe Corporation, New York, N. Y., a corporation of Delaware Application August 2, 1951, Serial No. 239,920

3 Claims. (Cl. 226—14)

The present invention relates to apparatus for making doughnuts and the like, and it has particular relation to apparatus for making and handling simultaneously a plurality of dough formations from the former to a proofing or raising operation.

Heretofore, it has been the practice to deposit raised dough formations into wire baskets having a plurality of semi-spherical depressions or pockets substantially the size and shape of the lower half if said formations after they have been raised or proofed. The deposited formations in such an operation are then carried by said baskets into a proofing room or chamber where they are subjected to sufficient heat and humidity to proof or raise the yeast therein. The raised dough formations are then removed from the proofing room or chamber and deposited into hot liquor in a cooking vessel by submerging their wire baskets in the hot cooking liquor until the formations rise and float free. This method of making raised doughnuts in commercial quantities is expensive and cumbersome, as well as space consuming since the baskets are heavy, expensive and require considerable storage space.

The disadvantages of the aforesaid method and operation are obviated with the present invention, which permits the former to deposit the dough forms directly onto a fabric or cloth apron that is traveling along a conveyor, brings a rigid supporting plaque into alignment with the discharge end of the conveyor, whereby an operator may manually slide the apron and its supported dough formations thereonto, whereupon the assembly being light in weight and requiring a minimum of space may be transported easily and conveniently to a storage rack or proofing chamber.

An object of the present invention is to provide a novel conveyor and transferring mechanism whereby raised dough formations may be extruded conveniently onto a sanitary apron traveling along a conveyor, the apron may be removed readily from the discharged end of the conveyor onto a rigid supporting plaque by which it may be transferred, as desired, without danger of disturbing or damaging the dough formations reposing thereon.

Another object of the invention is the provision of a simple, durable and economical apparatus for handling a plurality of raised dough formations efficiently and sanitarily.

A further object of the invention is to provide an elevator adapted to support in the form of a stack a plurality of rigid plaques, and to maintain in timed-sequence the top plaque of the stack in horizontal alignment with the discharge end of a delivery conveyor, whereby the flexible aprons holding a plurality of dough formations being removed from said conveyor may be readily transferred manually to the top plaque on said elevator for transportation to a proofing chamber or elsewhere, as desired.

Another object of the invention is to provide means for handling dough formations when no apron is passing beneath the former and it is extruding dough formations, and for recovering the discarded dough formations.

A further object of the invention is the provision of a novel flour sifter which sprinkles the aprons with dusting flour immediately preceding the dough former to prevent said formations from sticking to said aprons.

Other and further objects and advantages of the invention reside in the detailed construction of the several parts, which result in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a perspective view of the apparatus constructed in accordance with the principles of the invention;

Figure 2 is a side elevational view of the apparatus shown in Figure 1, with its side cover plates removed, to show the general driving mechanism;

Figure 3 is a fragmentary plan view, partially in section, of the apparatus as shown in Figure 2, the same having been taken substantially along the line 3—3 thereof, looking in the direction of the arrows;

Figure 4 is another fragmentary plan view, partially in section, of the apparatus as shown in Figure 2, the same having been taken substantially along the line 4—4 thereof, looking in the direction of the arrows;

Figure 5 is a detailed cross-sectional view of the driving mechanism shown in Figure 4, the same having been taken substantially along the line 5—5 thereof, looking in the direction of the arrows;

Figure 6 is an end elevational view of the plaque carrying elevator shown in Figure 1;

Figure 7 is a fragmentary side elevational view of the plaque carrying elevator;

Figure 8 is a fragmentary sectional plan view of the clutch mechanism for operating the elevator, the same having been taken substantially along the line 8—8 of Figure 7;

Figure 9 is a cross-sectional view of the dusting device shown in Figure 3, the same having been taken substantially along the line 9—9 thereof, looking in the direction of the arrows;

Figure 10 is a perspective view of one of the flexible cloth aprons upon which the dough formations are deposited by the former; and Figure 11 is a perspective view of one of the rigid supporting plaques used as a base support for the apron and its dough formations during its transferring and proofing periods.

Referring now to the drawings and particularly to Figure 1 thereof, there is shown an apparatus constructed in accordance with the principles of the invention including a rectangularly shaped supporting structure 12, having a table-like top surface 13, including four corner supporting legs 14 with suitable cross braces 15. The supporting structure 12 is closed in on all sides by suitable side cover plates 16 and end cover plates 17. The abutting ends of such cover plates are covered by a suitable angular molding strip 18 mounted by screws 19. The side cover plates 16 have each been provided with a pair of hinged doors 21, having door handles 22, which permit easy access to the driving and operating mechanism from opposite sides thereof.

Mounted above the table-like top surface 13 intermediate its ends are four upstanding legs 23, which are connected at their tops with suitable longitudinally extending braces 24 and cross braces 26. The opposite sides of this upstanding frame work are closed in with cover plates 27, whose corners are enclosed in angular molding strips 28 secured to the legs 23 by screws 29. This upstanding frame work has mounted thereon a large tank 31 provided with a removable cover 32 secured by a plurality of spaced fastening clamps 33 mounted circumferentially thereof. The tank 31 provides a dough hopper for a conventional doughnut former 34. The former 34 illustrated is provided with four transversely spaced extrusion nozzles 36, one of which is shown in detail in Figure 2, so that at each operation four dough formations 37 are extruded simultaneously, as best shown in Figure 1.

The dough former 34 depicted in the drawings is constructed substantially like the former shown and described in United States Letters Patent No. 2,317,897, issued April 27, 1943. It is driven by a motor 41, which is provided with a variable speed pulley 42 that drives a belt 43, which, in turn, drives a compressor 44. The compressor 44 is connected by a pipe 45 to an air supply tank 46, which, in turn, is connected through an air line 47, valve 48 and pressure gauge 49 to the top of the dough hopper 31. The motor 41 also drives a reduction gear 50, driving a conventional box peripheral cam mechanism 51, which through suitable mechanism not herein shown and described in detail imparts a rocking movement to a connecting rod 52. The connecting rod 52 imparts a rocking movement to the lever arm 53 (see Fig. 2) that opens and closes the extrusion nozzles 36 for extruding intermittently the dough forms 37. The housing 54 enclosing the operating mechanism for the cutter heads is for sanitary purposes to prevent grease, etc. from dripping onto the dough forms 37 passing along the conveyor therebelow. The air pump strainer and oil trap 56 is provided with a manual drain cock 57. A switch 58 connected by a conduit 59 through a fuse box 60 provides a suitable source of electric power for the motor 41 operating the dough former 34. Since the construction of the dough former 34 is incidental to this invention, and since the construction and operation thereof are described fully in the aforementioned Letters Patent, it is not believed necessary to describe it further herein.

Referring now to Figure 3, it will be noted that the table top 13 is slotted along and adjacent its opposite sides, as indicated at 61 and 62, to provide operating passageways for conveyor driving chain lugs 81. Each end of the table top 13 is provided with a suitable extension 63 and 64. The forward extension 63 has a shaft 66 journaled in bearings secured to the inner sides of its side supporting plates 67 immediately below the table top 13. The shaft 66 has sprocket wheels 68 and 69 keyed to its opposite ends. The rearwardly extension 64 likewise has a shaft 71 suitably journaled in bearings secured to its side supporting plates 72 immediately below the table top 13. The shaft 71 has sprocket wheels 73 and 74 keyed to its opposite ends in alignment with the sprocket wheels 68 and 69 of the shaft 66. A conveyor chain 76 is trained over the aligned sprocket wheels 68 and 73. A second conveyor chain 77 is trained over the aligned sprocket wheels 69 and 74. Each of the chains 76 and 77 has mounted thereon a series of longitudinally spaced laterally extending brackets, each of which has an upstanding pin 81 that operates in the slots 61 and 62 and extends slightly above the table top surface 13. The pins 81 of each chain are spaced oppositely one another and provide means for attaching an apron therebetween, whereby the aprons may be dragged by the chains longitudinally of the table-like top surface 13.

The apron 82 is best shown in Figure 10, and consists of a flexible rectangular piece of cloth made of canvas or other heavy ducking material. It is provided with metal eyelets 83 at each of its corners, having apertures therethrough capable of slidably receiving the upstanding pins 81. These eyelets 83 are adapted to fit slidably over the pins 81 of the conveyor chains 76 and 77. By providing eyelets 83 at all four corners of the aprons 82, it is possible to attach them to the conveyor chains without regard to which side is on top. In other words, the aprons 82 are then reversible and either side may be used to receive and convey dough formations 37, if desired.

There is mounted transversely of the table top 13 rearwardly of the dough former 34 a suitable flour dusting device 86, consisting of an elongated bin having sloping sides 87, a hinged cover 88 and a slotted bottom 91, as best shown in Figure 2. Referring now to Figures 3 and 9, a shaft 92 is mounted lengthwise of the bin 87 and journaled in bearings 93. A series of spiders 94 are mounted by means of set screws 95 to the shaft 92 at longitudinally spaced intervals, and each spider has three radially projecting fingers 96 depending therefrom. Mounted through the ends of the fingers 96 of the spiders 94 are longitudinally extending mixer rods 97, 98 and 99. One end of the shaft 92 has a cam member 101 fixedly secured thereto, which, in turn, is adapted to be meshed with a corresponding pivotal cam member 102 when the latter is forced into engagement therewith by the threaded hand wheel 103 mounted on the extreme end of said shaft 92. The cam member 102 has a rocker arm 104 formed integrally therewith, which is slotted as indicated at 106. This construction permits adjustment for varying the reciprocating speed of the rocking spider 94 and its mixing rods 97, 98 and 99.

The discharge end of the table-like top surface 13 has an elevator 110 mounted contiguous thereto, which is adapted to support a plurality of horizontally stacked plaques 111. The plaques 111 are of substantially the shape of the aprons 82, but being slightly larger in all of their dimensions. They may be made of any stiff material, such as, for example, wall board, plastic, sheet rock, cardboard, etc., just as long as they are strong enough to provide a tray support for an apron 82 and its dough formations 37.

The elevator 110 consists of a suitable supporting base 114 having a pair of upstanding supporting guide rods 116 and 117, whose tops are secured firmly to the underside of the forward extension 63, as best shown in Figure 2. An intermediate rod 118, which is threaded substantially its length, as indicated at 119, is suitably journaled in bearings 121 and 123 and serves as the means for raising and lowering the elevator carriage 124. The elevator carriage consists of a supporting frame structure 124 mounted slidably on the side guide rods 116 and 117, and having an internally threaded aperture through its vertical axis adapted to threadingly engage the intermediate rod 118. The frame structure 124 has a pair of forwardly or outwardly extending arms 126 and 127 mounted on opposite sides thereof by a series of bolts and nuts 129. The arms 126 and 127 serve as supports for a stack of plaques 111, as best shown in Figure 2.

The driving mechanism for the conveyor chains, duster and elevator is best shown in Figures 4, 5 and 8. Referring now to Figure 4, there is shown a motor 131 mounted on the main frame structure 12, having a driving stub shaft 132 provided with a variable speed pulley 133 secured fixedly thereto. A V-shaped belt 134 driven by the variable speed pulley 133 is, in turn, trained over a sheave 136 mounted on a shaft 137 that extends from a gear reduction box 138. The belt 134 is also trained over a second sheave 141, as best shown in Figure 5, which, in turn, is mounted fixedly on a shaft 142 that extends longitudinally forwardly of the apparatus to the elevator 110. The motor 131 is controlled by the electric switch 143 through the electric conduit 59, fuse box 60 and conduit 59'.

The reduction gear box 138 has a driving shaft 146 projecting outwardly therefrom, which has a pair of spaced sprocket wheels 147 and 148 keyed thereto. The inner sprocket wheel 147 drives a chain 149 that, in turn, drives a second sprocket wheel 151 mounted on a shaft 152 journaled in suitable bearing supports secured to the underside of the frame structure 12. The shaft 152 has a smaller sprocket wheel 153 keyed thereto, which drives a second chain 154 that, in turn, is trained over a sprocket wheel 156 keyed to the drive shaft 66 of the conveyor chains 76 and 78. The shaft 152 also has an arm 157 mounted idly thereon, which is provided at its outer end with a heavy weight 159. The arm 157 has a longitudinal slot 161 intermediate its ends in which is mounted an idler sprocket wheel 162 adapted to ride on the top side of the driving chain 149. By adjusting the position of the sprocket wheel 162 in the slot 161, the tension on the driving chain 149 may be readily controlled.

The outer sprocket wheel 148 of the gear reduction box 138 has a driving chain 171 trained thereover and over a much larger sprocket wheel 172 keyed to a shaft 173 mounted in bearing supports 174 secured to the main frame structure 12, as best shown in Figure 4. The shaft 173 has a beveled gear 175 keyed thereto intermediate its ends, which meshes with a beveled gear 176 keyed to the end of a second shaft 177 extending forwardly longitudinally of the main frame structure 12.

Referring now to Figure 8 of the drawings, it will be noted that the driving shafts 142 and 177 not only extend forwardly of the main frame structure 12, but also extend through the elevator base 114 and provide the driving mechanisms for raising and lowering said elevator 110. The forward end of the shaft 142 is journaled in a bearing support 181, and the forward end of the shaft 177 is similarly journaled in a corresponding bearing support 182. The shaft 142, which is driven through the Reeves drive 133 and 141, turns very rapidly as compared to the shaft 177, and serves as the driving means for lowering the elevator 110 quickly. A conventional friction clutch 184 is provided for driving the elevator 110 to lower the same quickly since a slight slippage in the clutch mechanism is of no serious consequence. The shaft 177, which is driven through the reduction gear box 138, sprocket wheels 148 and 174, turns very slowly, and serves as the driving means for raising the elevator 110. A conventional claw clutch 186 is provided for driving the elevator 110 at a positive speed. The elevator 110 is operated through a double drive and double clutch arrangement including a conventional friction clutch 184 and a conventional claw clutch 186, the clutches being moved into and out of driving arrangement with their respective shafts through a suitable manual operated handle member 187, which has been pivotally mounted on a stud secured to the base 114, as indicated at 188. The intermediate elevator rod 118, which is rotatably mounted between spaced bearing supports 121 and 123, is provided with worm threads substantially its entire length, as indicated at 119. A worm-wheel 191 is keyed to the lower end of the elevator rod 118, and separated from its lower bearing support 121 by means of a spacer 192.

The shaft 142 has a sleeve 196 mounted freely thereon adjacent its bearing support 181, which has a worm 197 keyed thereto. The worm 197 is meshed with the worm-wheel 191 at all times, and serves to drive the elevator 110 when its friction clutch 184 is engaged. The rearward end of the sleeve 196 has one disk 198 of the friction clutch 184 formed integrally therewith. The opposite disk 199 is formed on the forward end of a second sleeve 201 which is keyed slidably onto the shaft 142. The second sleeve 201 has a groove 202 cut circumferentially thereof for receiving a stud 203 mounted fixedly on a yoke 204 welded or otherwise fastended to the underside of the handle member 187 passing thereover. When the handle member 187 is moved to the left or forwardly of the apparatus, the two friction disks 198 and 199 will be brought together on the shaft 142, and the disk 199 will frictionally drive the disk 198 with it, thus driving the worm 197, causing its worm-wheel 191 to revolve, which, in turn, rotates the geared rod 118, causing the elevator 110 to be lowered.

The shaft 177 has a sleeve 206 mounted freely thereon adjacent its bearing support 182, which has a worm 207 keyed thereto. The worm 207 is meshed with the worm-wheel 191 at all times, and serves to drive it, when in driving engagement through its clutch 186, in the reverse direction from the worm 197, thereby raising the elevator when in driving engagement. The rearward or inside end of the sleeve 206 is provided with a cam-conformation 208. A second sleeve 210 is keyed slidably onto the shaft 177, and has a corresponding cam-conformation 211 along its forward edge adapted to mesh with the cam-conformation 208 of the sleeve 206 when the sleeves 206 and 210 are forced together. The sleeve 210 has a groove cut circumentially thereof adjacent its rear edge for receiving a stud 213 mounted fixedly on a yoke 214 welded or otherwise secured to the underside of that portion of the handle member 187 passing thereover. When the handle member 187 is moved to the right or rearwardly of the apparatus, the stud 213 will force the sleeves 206 and 210 together until their claw surfaces or cam-comformations 208 and 211 interlock, whereupon the sleeve 210 will cause the sleeve 206 to rotate with it, thereby rotating the worm 207, which, in turn, rotates the worm-wheel 191 in the opposite direction, causing the elevator 110 to be raised. The manipulating handle 187, which in the drawings is shown extending transversely of the elevator base, is in a neutral position with neither clutch mechanism engaged in a driving arrangement. It will be noted that the handle 187 manipulates both clutch mechanisms and is pivoted in the middle. This construction prevents more than one clutch operating at any one time, because no matter which way the handle 187 is moved, it must disengage one of the clutches before the other can be engaged. Therefore, the elevator 110 may only be operated in one direction at any given time.

The table top 13, as best shown in Figure 3, is provided with a series of holes or apertures 216 immediately below and in vertical alignment with the dough extrusion nozzles 36. Immediately below said holes 216, as best shown in Figure 2, is mounted a sliding drawer 217. The purpose of the holes 216 in the table top 13 is to permit dough forms 37 to drop therethrough in the event the extruder nozzles 36 are operating and no apron 82 has been mounted on the pins 81 of the conveyor chains. At such times the dough forms 37 pass through the holes 216 and drop into the drawer 217 from which they may eventually be recovered. If no such provisions were made, the dough forms 37 would fall on the table top supporting surface 13 and the next apron to pass therealong would smear them under, making the top surface 13 messy, sticky and insanitary, as well as spoiling the dough as far as recovery is concerned.

The dusting device 86 is adapted to sprinkle flour onto the top surface of the aprons 82 passing therebelow. Its driving means is secured from the main conveyor chain 76, which is trained over a driving sprocket wheel 221 (see Fig. 2) fixedly mounted on a shaft 222 mounted between suitable bearing supportings 223 secured to spaced brackets 224 mounted on the main frame supporting structure 12. The shaft 222 has a large sprocket wheel 226 keyed thereto, which drives a chain 227 that is trained over a smaller sprocket wheel 228 keyed to a shaft 229 mounted in suitable bearing supports secured between the brackets 231 mounted on the main frame structure. The small sprocket wheel 228 has a stud 232 mounted eccentrically thereof, which is, in turn, connected pivotally to the lower end of the connecting rod 230.

In describing the operation of the apparatus, it will be assumed that the motors 41 and 131 have been started by their respective switches 58 and 143, which means that the conveyor chains 76 and 77 will be moving forwardly or from right to left, the flour duster 86 will be sprinkling flour and the dough former 34 will be extruding dough formations 37.

An operator standing at the extreme right end of the machine will be positioning aprons 82 on the pins 81 of the conveyor chains. As these aprons 82 pass under the duster 86 they will be sprinkled with flour, and when they pass under the nozzles 36 of the former 34 a row of dough formations 37 will be deposited transversely of the apron. The former 34 operates at a rate of speed which is in timed sequence with the movement of the aprons so as to completely fill the aprons with rows of dough formations, as best shown in Figure 1. Of course, if no apron is passing below the extrusion nozzles 36, the extruded dough formations will drop through the openings 216 in the table top 13 and fall into the drawer 217.

As the filled aprons 82 approach the discharge end of the conveyor, an operator at that end moves the handle 187 of the elevator to engage its claw clutch 186, thereby causing the elevator 110 to rise. The speed of the elevator 110 is so timed with respect to the speed of the conveyor that it rises the thickness of one plaque 111 while the conveyor is moving a distance equal to the longitudinal distance between the spaced pins 81. With this speed relationship, the top-most plaque 111 of the stack on the conveyor 110 is maintained substantially in horizontal alignment with the table top 13. An operator, as best shown in Figure 1, takes the apron 82 by its front corners and lifts it up sufficiently to remove the eyelets 83 from the pins 81, and, as the conveyor moves further forwardly, he draws the front edge of the apron 82 onto the top plaque 111 until the same is properly centered thereon. The operator obviously draws the aprons 82 somewhat faster than the conveyor is moving to allow himself time to return to remove the next succeeding apron in like manner. The elevator operator removes the loaded plaques from the elevator 110 and places them in bakery racks for storage or proofing. It is his job to keep the elevator 110 loaded with plaques, and, when the last plaque is used, he quickly shifts the handle 187, throwing out the claw clutch 186 and engaging the friction clutch 184, which quickly lowers the elevator to a level adapted to receive a quantity of additional plaques. This loading of the elevator may be done at any time, and is most frequently accomplished at a time when one or more aprons are missing on the conveyor chains. With this simple operation a few operators can turn out large quantities of dough formations in a relatively short period of time, and production far exceeds that which can be accomplished with other known operations.

Although I have described in detail only one embodiment which my invention may assume, it will be readily apparent to those skilled in the art that the same is not so limited, but that various other modifications may be made therein without departing from the spirit thereof.

What I claim is:

1. In apparatus for handling dough formations and the like, a supporting structure having a table-like top surface, a conveyor for moving a plurality of aprons in spaced relation longitudinally of said table top, an elevator mounted adjacent the discharge end of said table top for supporting a plurality of stacked plaques which are to be used one at a time as a support for each of said aprons, and means for operating continuously said conveyor and raising said elevator synchronously and continuously whereby the top plaque of said stack is maintained in substantial horizontal alignment with said table top at the time its apron is positioned thereon.

2. In apparatus for handling dough formations and the like, a supporting structure having a table-like top surface, a conveyor for moving a plurality of aprons in spaced relation over said table top, and elevator mounted adjacent the discharge end of said table top for supporting a plurality of stacked plaques which are to be used one at a time as a support for each of said aprons, means for operating continuously said conveyor and raising said elevator synchronously and continuously whereby the top plaque of said stack is maintained in substantial horizontal alignment with said table top at the time its apron is positioned thereon, and means associated with said conveyor driving means for lowering said elevator continuously at a much faster rate of speed than the speed at which it is raised.

3. In apparatus for handling dough formations and the like, a table top, a pair of spaced chains operating on opposite sides of said table top, oppositely spaced means carried by said chains for attaching an apron removably therebetween, an elevator mounted adjacent the discharge end of said table top for supporting a plurality of vertically stacked plaques, means for driving said conveyor chains continuously, means for connecting said elevator to said conveyor driving means for raising said elevator at a constant and continuous rate of speed whereby the top plaque is maintained in substantial alignment at all times with said table top, means for connecting said elevator to said conveyor driving means for lowering said elevator at a much faster rate of speed than the speed at which it is raised, and means for disengaging said connecting means from said conveyor driving means whereby the elevator may be stopped without stopping said conveyor driving means.

References Cited in the file of this patent

UNITED STATES PATENTS

| Number | Name | Date |
|---|---|---|
| 467,003 | Ferraioli | Jan. 12, 1892 |
| 488,404 | Robertson | Dec. 20, 1892 |
| 1,761,064 | Bausman | June 3, 1930 |
| 1,939,400 | Kerche | Dec. 12, 1933 |
| 2,145,916 | Belluche et al. | Feb. 7, 1939 |